(12) United States Patent
Ruscher et al.

(10) Patent No.: US 10,627,923 B2
(45) Date of Patent: Apr. 21, 2020

(54) STYLUS FOR ELECTRONIC DEVICES

(71) Applicant: Apple Inc., Cupertino, CA (US)

(72) Inventors: Joel N. Ruscher, Fremont, CA (US); Ryan P. Brooks, Menlo Park, CA (US); Henry N. Tsao, Mountain View, CA (US); Wing-Shan Wong, Sugar Land, TX (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/231,058

(22) Filed: Dec. 21, 2018

(65) Prior Publication Data

US 2020/0089340 A1 Mar. 19, 2020

Related U.S. Application Data

(60) Provisional application No. 62/733,020, filed on Sep. 18, 2018.

(51) Int. Cl.
*G06F 3/0354* (2013.01)
*G06F 3/038* (2013.01)
*H02J 7/02* (2016.01)
*G06F 3/044* (2006.01)

(52) U.S. Cl.
CPC ........ *G06F 3/03545* (2013.01); *G06F 3/0383* (2013.01); *G06F 3/044* (2013.01); *H02J 7/025* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 2006/0158440 A1 | 7/2006 | Ashenbrenner | |
| 2014/0035887 A1* | 2/2014 | Kim | G06F 3/03545 345/179 |
| 2018/0081455 A1 | 3/2018 | Huston et al. | |

FOREIGN PATENT DOCUMENTS

EP 3258350 12/2017

OTHER PUBLICATIONS

International Search Report and Written Opinion from PCT/US2019/012761, dated Jul. 17, 2019, 14 pages.
Invitation to Pay Additional Fees from PCT/US2019/012761, dated May 21, 2019, 12 pages.

* cited by examiner

*Primary Examiner* — Nicholas J Lee
(74) *Attorney, Agent, or Firm* — Morgan, Lewis & Bockius LLP

(57) ABSTRACT

Touch-based input devices, such as a stylus, can receive tactile input from a user. The tactile input functions can be performed by a touch sensor, such as a capacitive sensing device. A touch sensor can be integrated into a stylus in a low profile form. Wireless charging and magnetic coupling with a host device are also facilitated. The stylus can be provided with the above features in a small form factor that improves a user experience with the stylus.

20 Claims, 9 Drawing Sheets

STYLUS FOR ELECTRONIC DEVICES

CROSS-REFERENCE TO RELATED APPLICATIONS

This application claims the benefit of U.S. Provisional Application No. 62/733,020, entitled "STYLUS FOR ELECTRONIC DEVICES," filed Sep. 18, 2018, the entirety of which is incorporated herein by reference.

TECHNICAL FIELD

The present description relates generally to input devices, and, more particularly, to a stylus for use with a touch screen of an electronic device.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
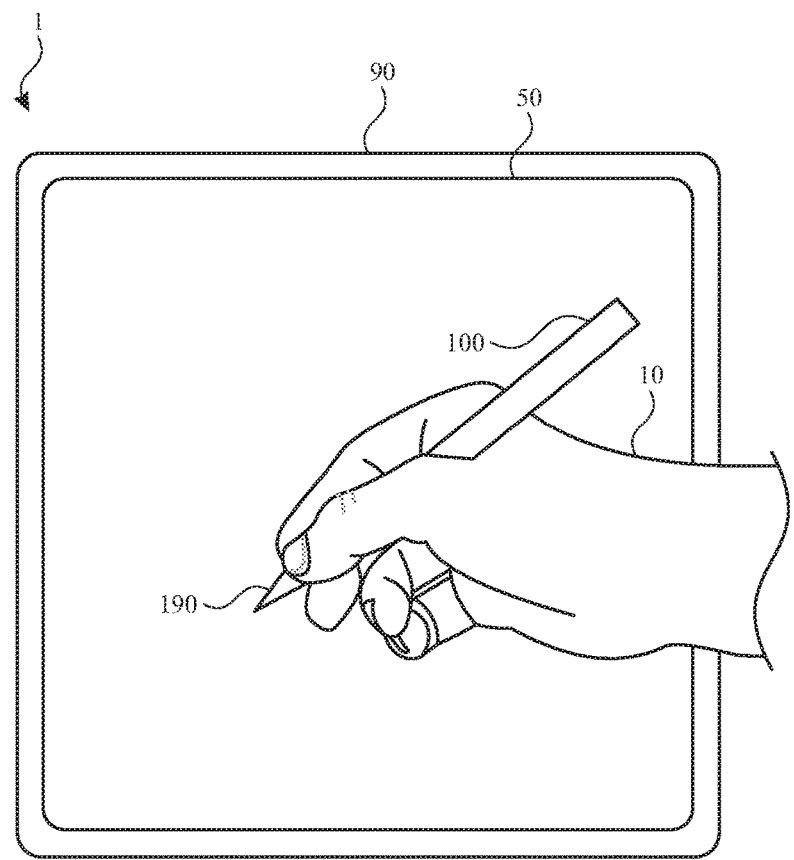
FIG. 1 illustrates a view of a system including a stylus and a host device, according to some embodiments of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

Furthermore, while the user is holding a stylus or other touch-based input device, the user may be limited to the input options provided thereby. Accordingly, additional input capabilities that are integrated into the input device would provide the user with expanded input capabilities without the need to simultaneously operate additional input devices.

In accordance with embodiments disclosed herein, components of a stylus and the assembly thereof can be provided in a manner that facilitates capacitive touch input, magnetic coupling with a host device, and wireless charging from the host device.

In accordance with embodiments disclosed herein, a stylus can receive tactile input from a user. The tactile input functions can be performed by a touch sensor, such as a capacitive sensing device. A touch sensor can be integrated into an input device in a low profile form that facilitates assembly and securement of the components of the stylus.

In accordance with embodiments disclosed herein, a stylus can perform interactions with a host device, such as wireless charging and magnetic coupling. By providing wireless charging and magnetic coupling to a host device, the stylus can be operated without requiring mechanical coupling to the host device or another charging unit. Accordingly, the components of the stylus are not subjected to excessive mechanical stresses that would otherwise be required with charging system that requires a mechanical connection (e.g., plug).

In accordance with embodiments disclosed herein, a stylus can be provided with the above features in a small form factor that improves a user experience with the stylus. The components of the stylus are assembled in a manner that provides performance of the above functions while maintaining the components in a secure arrangement. For example, the touch sensor is provided with a precise fit within a housing to provide accurate touch detection, despite the presence of other components that also fit within the housing.

These and other embodiments are discussed below with reference to FIGS. 1-20. However, those skilled in the art will readily appreciate that the detailed description given herein with respect to these Figures is for explanatory purposes only and should not be construed as limiting.

A touch-based input device in accordance with embodiments disclosed herein can include any device that is held, worn, or contacted by a user for providing input and/or receiving feedback. The touch-based input device can be used alone or in conjunction with another device. For example, FIG. 1 illustrates a system 1 including a stylus 100 and a host device 90 having a surface 50, according to some embodiments of the subject technology. The stylus 100 can be held by a user 10 and operate as a touch-based input device for use with the host device 90.

The surface 50 of the host device 90 can include a display surface and/or a touch panel for interacting with the stylus 100 when contacted thereby. The host device 90 utilizes the display to render images to convey information to the user. The display can be configured to show text, colors, line drawings, photographs, animations, video, and the like. The surface 50 of the host device 90 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

The stylus 100 can include a tip 190 for contacting the surface 50. Such contact can be detected by the host device 90 and/or the stylus 100. For example, the stylus 100 can include one or more sensors that detect when the tip 190 contacts and applied pressure to the surface 50. Such sensors can include one or more contact sensors, capacitive sensors, touch sensors, cameras, piezoelectric sensors, pressure sensors, proximity sensors, electric field sensors, photodiodes, and/or other sensors operable to detect contact with the surface 50. Such sensors can optionally operate cooperatively with the host device 90 to detect contact with the surface 50.

Figure 2:
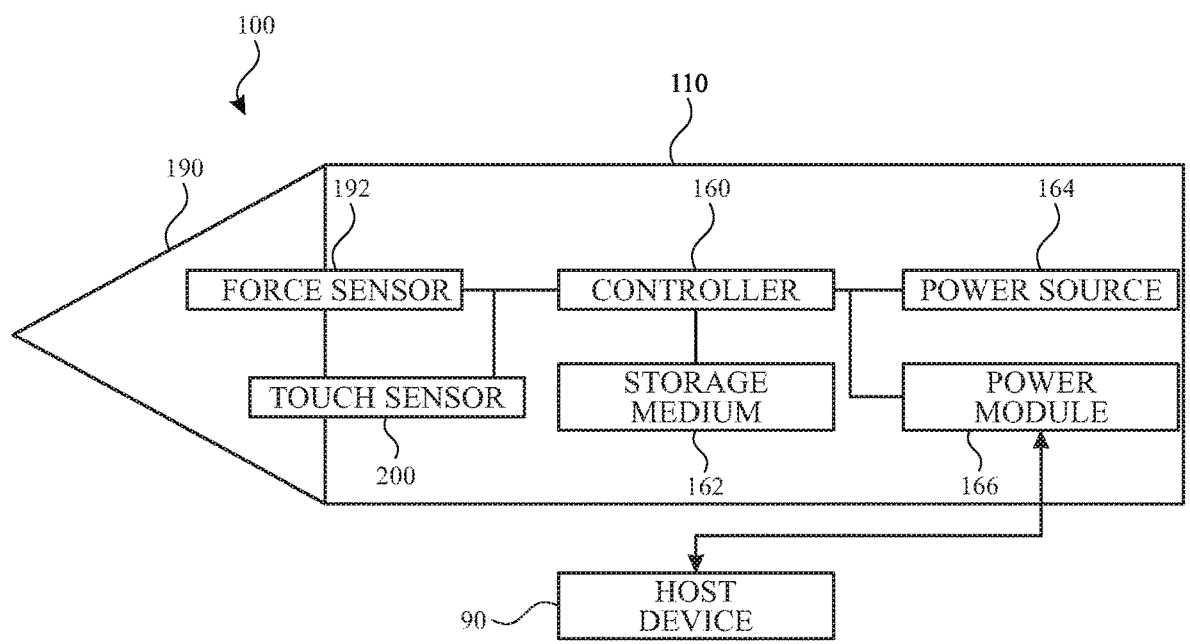
FIG. 2 illustrates a block diagram illustrating the stylus and the host device of FIG. 1, according to some embodiments of the subject technology.

As shown in FIG. 2, the stylus 100 can include components that support handling and operation by a user. Inputs can be provided by a user at one or more components of the stylus 100.

A force sensor 192 can be operated to detect user inputs at the tip 190 of the stylus 100. The force sensor 192 can interact with both the tip 190 and the housing 110 to detect relative motion of the tip 190 and the housing 110. For example, the force sensor 192 can be operated to detect when the tip 190 is contacting a surface, such as the surface of the host device 90. The detection can be based on movement of the tip 190 relative to the housing 110. Accordingly, the force sensor 192 can be directly or indirectly connected to both the tip 190 and the housing 110 to detect relative motion there between. The force sensor 192 can include a component that converts mechanical motion of the tip 190 into an electric signal. The force sensor 192 can include one or more contact sensors, capacitive sensors, touch sensors, strain gauges, cameras, piezoelectric sensors, pressure sensors, photodiodes, and/or other sensors. The force sensor 192 can detect both the presence and magnitude of a force.

In use, a user may manipulate the stylus 100 and apply a force to a surface of the host device 90. A corresponding reaction force may be transferred through the tip 190 of the stylus 100 connected to an electromechanical coupling and to the force sensor 192 of the stylus 100. The force sensor 192, or a portion thereof, may deform in response which may be measured and used to estimate the applied force. The force sensor 192 can be used to produce a non-binary output that corresponds to the applied force. For example, the force sensor 192 can be used to produce an output that represents a magnitude that varies in accordance with a variable amount of applied force.

A touch sensor 200 can be provided to detect contact by a user on a grip region of the housing 110 of the stylus 100. The touch sensor 200 can include a capacitive touch sensor, such as a self-capacitance sensor. As described further herein, the touch sensor 200 can include multiple sensing elements, such as conductive electrodes, to detect contact and changes in contact at multiple locations.

As further shown in FIG. 2, the stylus 100 can include a controller 160 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 160 can execute one or more instructions stored in the non-transitory storage medium 162 to perform one or more functions.

As further shown in FIG. 2, the stylus 100 can include a power source 164, such as one or more batteries and/or power management units. The stylus 100 can include components for charging the power source 164, such as a power module 166. The power module 166 can include one or more components for receiving and/or transmitting power wirelessly (e.g., inductively), for example from the host device 90.

The stylus 100 can include a communication component (not shown) for communicating with the host device 90 and/or another device. The communication component can include one or more wired or wireless components, WiFi components, near field communication components, Bluetooth components, and/or other communication components. The communication component can include one or more transmission elements, such as one or more antennas. Alternatively or in combination, the communication component can include an interface for a wired connection to the host device 90 and/or another device.

The stylus 100 can include other components including, but not limited to, displays, sensors, switches (e.g., dome switches), buttons, voice coils, and/or other components. The stylus 100 can detect environmental conditions and/or other aspects of the operating environment of the stylus 100 with an environmental sensor such as an ambient light sensor, proximity sensor, temperature sensor, barometric pressure sensor, moisture sensor, and the like. The stylus 100 can include a haptic feedback component that provides haptic feedback with tactile sensations to the user. The haptic feedback component can be implemented as any suitable device configured to provide force feedback, vibratory feedback, tactile sensations, and the like. For example, in one embodiment, the haptic feedback component may be implemented as a linear actuator configured to provide a punctuated haptic feedback, such as a tap or a knock. The stylus 100 can detect motion characteristics of the stylus 100 with a motion sensor such as an accelerometer, a gyroscope, a global positioning sensor, a tilt sensor, and so on for detecting movement and acceleration of the stylus 100. The stylus 100 can detect biological characteristics of the user manipulating the stylus with a biosensor that detects skin temperature, heart rate, respiration rate, blood oxygenation level, blood volume estimates, blood pressure, or a combination thereof. The stylus 100 can quantify or estimate a property of an object nearby or otherwise external to the stylus 100 with a utility sensor such as magnetic field sensors, electric field sensors, color meters, acoustic impedance sensors, pH level sensor, material detection sensor, and so on. Such data may be used to adjust or update the operation of the stylus 100 and/or may communicate such data to the host device 90 to adjust or update the operation thereof The host device 90 can also include components that facilitate operation of the stylus 100. For example, the host device 90 can include one or more of a processor, a memory, a power supply, one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on. In some embodiments, a communication interface of the host device 90 facilitates electronic communications between the host device 90 and the stylus 100.

As noted with respect to many embodiments described herein, a stylus configured to provide input capabilities and wireless charging may be constructed in a manner that facilitates these functions in a compact form. Generally and broadly, embodiments described herein provide touch sensing capabilities on an outer surface of the stylus, magnetic components for coupling to a host device, and wireless charging components for receiving power from the host device. One such example stylus is described below with reference to FIGS. 3-7. However, it may be appreciated that the generalized layout presented therein and described below are merely one example and that other embodiments can be implemented in different ways.

FIGS. 3-7 depict various components of a stylus 100 in exploded views. To facilitate an understanding of the interoperation and assembly of the various components of the stylus 100, FIGS. 3-7 are provided, showing an exploded view of the stylus 100 (e.g., FIG. 3), an exploded view of front and rear internal components of the stylus 100 (e.g., FIG. 4), an exploded view of rear components of the stylus 100 (e.g., FIG. 5), an exploded view of front components of the stylus 100 (e.g., FIG. 6), and exploded view of a coordination engine assembly of the stylus 100 (e.g., FIG. 7).

Figure 3:
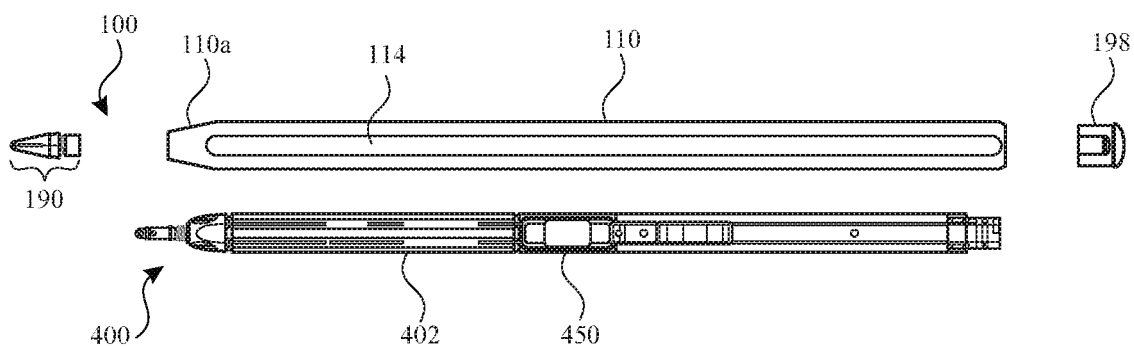
FIG. 3 illustrates an exploded view of various components and subsystems of a stylus.

Referring to FIG. 3, the stylus 100 of the illustrated embodiment includes a housing 110. The housing 110 is hollow. The housing 110 may take various forms to facilitate convenient, familiar, and comfortable manipulation or the stylus 100 by a user. In the illustrated example, the housing 110 has the general form of a writing instrument, such as a pen or a pencil. The housing 110 is generally cylindrical with a flat portion 114 providing an exterior surface on a side thereof. The housing 110 can be formed from plastics, metals, ceramics, laminates, glass, sapphire, wood, leather, synthetic materials, or any other material or combination of materials.

The housing 110 can be configured to connect or be bonded to a cap 198 at an end of the housing 110. The cap 198 may be configured to provide a cosmetic end to the housing 110 of the stylus 100. The cap 198 forms a substantially continuous external surface with the housing 110 when attached to the housing 110. The cap 198 may be formed from any suitable material, such as, but not limited to, metal, plastic, glass, ceramic, sapphire, and the like or combinations thereof. In many cases, the cap 198 is formed from the same material as the housing 110, although this is not required. In some embodiments, the cap 198 may be configured, entirely or partially, as a signal diffuser to diffuse an infrared signal or another optical signal, such as a multi-color light-emitting diode. In other cases, the cap 198 may be configured, entirely or partially, as an antenna window, allowing for wireless communications and/or electric fields to pass there through. As illustrated, the cap 198 terminates in a rounded end, although this is not required of all embodiments. In some embodiments, the cap 198 terminates as a plane. In other embodiments, the cap 198 terminates in an arbitrary shape.

In the illustrated embodiment, the housing 110 tapers at one end. The tapered end of the housing 110 is identified in the figure as the tapered end 110a. As illustrated, the tapered end 110a may be formed integrally with the housing 110. In other embodiments, the tapered end 110a is a separate piece from the housing 110. A tip 190 is partially disposed within the tapered end 110a. Other portions of the tip 190 are attached, either permanently or removably, to the end of the tapered end 110a from the exterior thereof. The tip 190 generally takes a conical shape, however such a shape is not required of all embodiments. The tip 190 may be configured to removably or permanently engage with a portion of a coordination engine assembly (described in detail below) disposed within the housing 110. The tip 190 may be configured to contact an input surface of an electronic device. The tip 190 may taper to a point, similar to a pen, so that the user may control the stylus 100 with precision in a familiar form factor. In some examples, the tip 190 may be blunt or rounded, as opposed to pointed, or may take the form of a rotatable or fixed ball.

As shown in FIG. 3, an internal assembly 400 can be provided for insertion into the housing 110 during assembly. The internal assembly 400 can assembled together before, during, or after at least partial insertion of components thereof into the housing 110. Insertion can be provided through an end of the housing that is subsequently covered with the cap 198. The tip 190 can be connected to the internal assembly through the tapered end 110a of the housing 110 after the internal assembly 400 is inserted and/or secured within the housing 110. The internal assembly 400 can include a support member 402 that further includes a front frame of a front assembly and a rear frame of a rear assembly, as discussed further herein.

Figure 4:
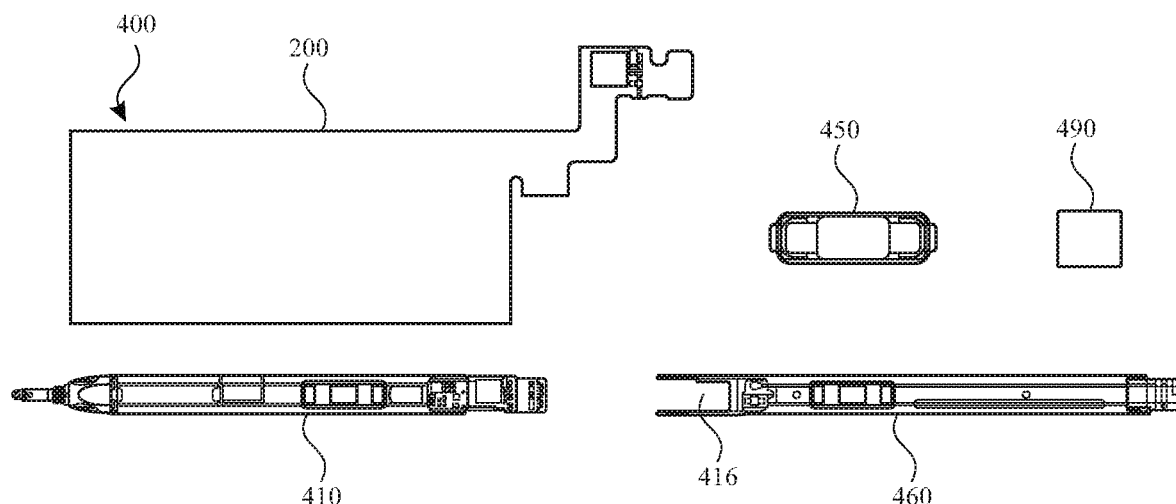
FIG. 4 illustrates an exploded view of various components and subsystems of the stylus of FIG. 3.

Referring now to FIG. 4, The internal assembly 400 can include a front assembly 410 and a rear assembly 460 that are mechanically and/or operatively connected together to provide internal and functional components of the stylus. A wireless power receiver 450 can be provided at least partially within or adjacent to a window 416 provided between the front assembly 410 and the rear assembly 460, as discussed further herein. Provision of the wireless power receiver 450 within the window 416 can avoid interference and/or blocking of wireless signals to the wireless power receiver 450.

The stylus 100 can include a touch sensor 200 to be wrapped about at least the front assembly 410. The touch sensor 200 can be a capacitive touch sensor that extends along at least a portion of a length of the stylus 100 when assembled. The touch sensor 200 can extend at least partially within a grip region of the stylus 100. Additionally or alternatively, the touch sensor 200 can extend to and/or at least partially within a tip 190 of the stylus 100. Additionally or alternatively, the touch sensor 200 can extend to an end of the stylus 100 that is opposite the tip 190. The touch sensor 200 can be used to detect contact with or proximity to a finger of the user. Additionally or alternatively, the touch sensor 200 can be used to detect contact with or proximity to another object, such as a surface to which the stylus is applied. The stylus 100 can include multiple touch sensors 200. Each of the multiple touch sensors 200 can extend within a different portion of the housing 110. The touch sensors 200 can be spaced apart from each other. At least one of the touch sensors 200 can extend along the grip region. Gestures detected by the separate touch sensors 200 can be interpreted as different user inputs according to preprogrammed functions to be performed by the stylus 100 and/or a host device upon detection of the user gestures. The touch sensor 200 can be positioned at and/or extend to an end of the stylus 100 that is opposite the tip 190.

As shown in FIG. 4, one or more lids 490 can be included to cover corresponding windows that provide openings through a periphery of the front assembly 410 and/or the rear assembly 460, as discussed further herein.

Figure 5:
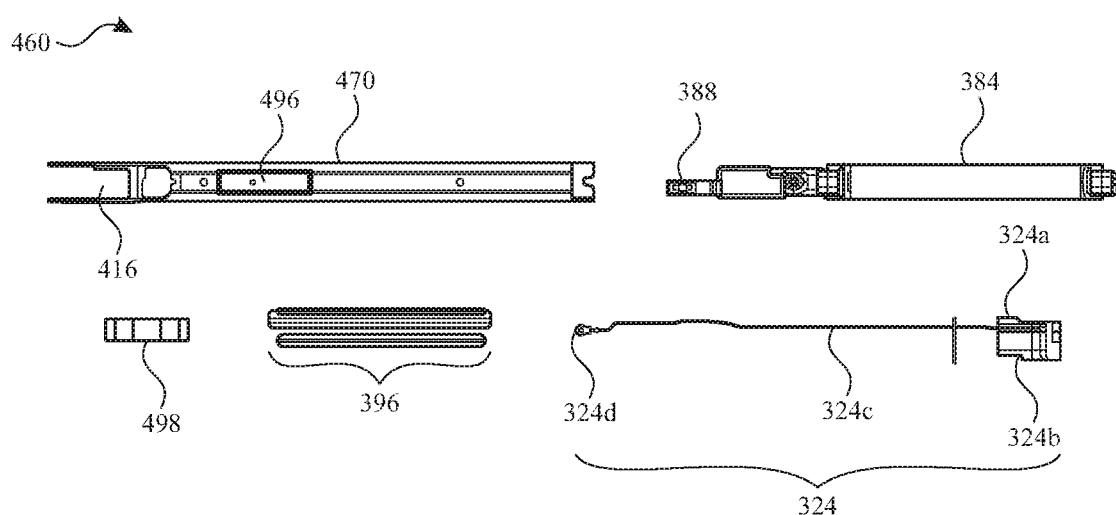
FIG. 5 illustrates an exploded view of various components and subsystems of a rear portion of the stylus of FIG. 3.
Figure 6:
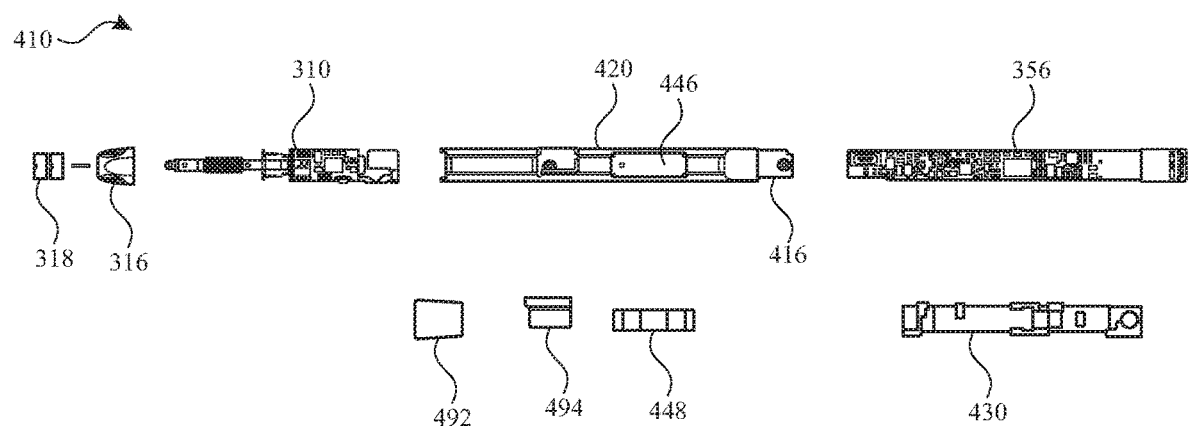
FIG. 6 illustrates an exploded view of various components and subsystems of a front portion of the stylus of FIG. 3.

Referring now to FIGS. 5 and 6, a frame assembly can include a front frame 420 and a rear frame 470, which are joined together to house and/or support various components and provide wireless communication and/or charging between the stylus and the host device. The front frame 420 and/or the rear frame 470 are configured to slide into the interior volume of the housing 110 and may provide structural support mounting features for the various internal components of the stylus 100. The front frame 420 and/or the rear frame 470 has a shape that corresponds to the shape of the housing 110. In this case, the front frame 420 and/or the rear frame 470 can take a substantially cylindrical shape. In some examples, the front frame 420 and/or the rear frame 470 can include one or more electrically insulating layers disposed on an exterior surface thereof. The electrically insulating layers can prevent the front frame 420 and/or the rear frame 470 from interfering with the operation of one or more circuits within the stylus 100. In other examples, the front frame 420 and/or the rear frame 470 can be electrically connected to one or more circuits. In many examples, the front frame 420 and/or the rear frame 470 can serve as a system ground, proving an electrical ground for all (or substantially all) the electrical circuits disposed within the stylus 100. In other cases, the front frame 420 and/or the rear frame 470 can also serve as a ground plane for one or more antenna elements.

The front frame 420 and/or the rear frame 470 may also include one or more access or assembly windows. The assembly windows may be included to facilitate simplified manufacturing of the stylus 100. For example, the assembly window can be defined in the front frame 420 and/or the rear frame 470 adjacent a location at which a hot bar operation is desired or preferred to electrically couple one component to another, when both components are already disposed within the front frame 420 and/or the rear frame 470. In other examples, the assembly windows can be defined adjacent to a location at which a connection between two separate circuits is made via a connector. In some cases, an assembly window may not be required.

In some examples, assembly windows may be covered once the manufacturing operation necessitating the assembly window is completed. In some cases, the assembly window can be covered by an electrically conductive tape. In another case, the assembly window can be covered by welding a plate over the assembly window. As may be appreciated, the cover disposed over the assembly window in certain embodiments may be electrically conductive in order to provide electromagnetic shielding to the electronic elements that are disposed within the frame assembly.

Referring now to FIG. 5, the rear assembly 460 can include a rear frame 470 and components supported thereby. As shown in FIG. 5, the rear frame 470 can define at least a portion of the charging window 416 as a void or open space extending through the rear frame 470. At least a portion of the charging window 416 can also be defined by the front frame 420. Similarly, the rear frame 470 can further define a rear window 496 as a void or open space extending through the rear frame 470 and for receiving a rear magnet 498, as discussed further herein.

As further shown in FIG. 5, a battery pack 384 may be provided for insertion within the rear frame 470. The battery pack 384 can include a lithium-polymer battery pack or a lithium ion battery. However, in other embodiments, alkaline batteries, nickel-cadmium batteries, nickel-metal hydride batteries, or any other suitable rechargeable or one-time-use batteries may be used. The battery pack 384 can include one or more leads that are configured to permanently or removably attach to the processing unit circuit board set 356 (see FIG. 6). The battery pack 384 includes a power control board 388, which includes circuitry configured to control the charge and/or discharge rate of the battery pack 384.

As further shown in FIG. 5, an antenna assembly 324 can be provided for wireless communication. The antenna assembly 324 can include an antenna 324a, an antenna support block 324b, a transmission line 324c, and a connector 324d. The antenna 324a is disposed onto or otherwise coupled to the antenna support block 324b. In some embodiments, the antenna support block 324b is formed from a dielectric material, such as plastic. The antenna support block 324b defines an internal volume. The internal volume of the antenna support block 324b can be sized and/or otherwise configured to retain other components of the stylus 100. The connector 324d may be configured to directly connect to a connector on the processing unit circuit board set 356 (see FIG. 6). In many cases, the connector 324d and the transmission line 324c may be shielded so that signals passing there through are not affected by external interference and, oppositely, the signals passing there through do not affect any components within the stylus 100. The transmission line 324c may be configured to run alongside or adjacent to the battery pack 384 when the antenna assembly 324 and the battery pack 384 are assembled within the rear frame 470. The transmission line 324c is generally aligned to be parallel to the longitudinal axis of the stylus. As noted above, the antenna assembly 324 is partially inserted into the rear frame 470 so that the antenna 324a protrudes beyond an end of the rear frame 470 and is not covered by the rear frame 470. Additionally or alternatively, the antenna 324a can be aligned with a window in the rear frame 470. In some cases, the transmission line 324c can be separated from an inner surface of the rear frame 470 by a compressible element 396. The compressible element 396 includes a compressible foam and/or one or more binding elements (e.g., tape). The binding elements can attach the compressible foam of the compressible element 396 and the transmission line 324c to the battery pack 384.

Referring now to FIG. 6, the front assembly 410 can include a front frame 420 and components supported thereby. As shown in FIG. 6, the front frame 420 can define at least a portion of the charging window 416 as a void or open space extending through the front frame 420. At least a portion of the charging window 416 can also be defined by the rear frame 470. Similarly, the front frame 420 can further define a front window 446 as a void or open space extending through the front frame 420 and for receiving a front magnet 448, as discussed further herein.

The front assembly 410 can include a coordination engine assembly 310 for detecting force-based inputs at the tip 190, as discussed further herein. The coordination engine assembly 310 can be inserted within the front frame 420. A support collar 316 and a flanged nut 318 are provided to support the coordination engine assembly 310 within the front frame 420. The flanged nut 318 can be welded, soldered, or otherwise permanently adhered to the front frame 420. The front frame 420 can take the shape of a sleeve that inserts within the housing. The front frame 420 can be fixed with respect to an interior surface of the housing. The support collar 316 can be connected to the flanged nut 318. In some examples, the support collar 316 abuts a lip or ring within an interior surface of the housing.

A processing unit circuit board set 356 can be provided, for example, within the front frame 420. The processing unit circuit board set 356 may include one or more substrates on or through which one or more electronic components are disposed. These components may be surface mount or through-hole components. Components may be attached to both sides of the substrate. The substrate can be a single layer circuit board, a multi-layer circuit board, or a flexible circuit board. In some examples, a flexible circuit board can be used that is made rigid with one or more stiffeners. The processing unit circuit board set 356 can be operably connected to other components of the stylus, include the power control board 388 of the battery pack 384, the antenna assembly 324 (e.g., via the connector 324d), and the wireless power receiver 450.

Figure 7:
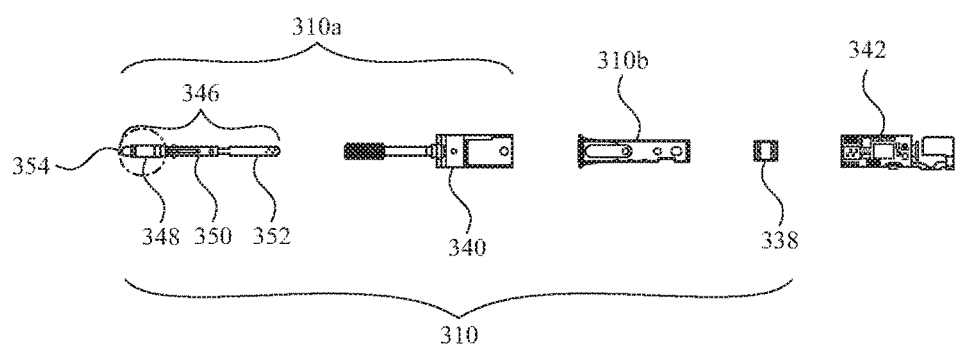
FIG. 7 illustrates an exploded view of various components and subsystems of a coordination engine assembly of the stylus of FIG. 3.

Referring now to FIG. 7, the coordination engine assembly 310 can include components for detecting forces and orientations of the stylus. The coordination engine assembly 310 includes a rigid signal conduit 310a and a force-sensitive structure 310b.

In some examples, the force-sensitive structure 310b can include a lateral bed with two cantilevered legs extending from each end of the lateral bed. In some embodiments, the force-sensitive structure 310b also includes an element that exhibits an electrically-measurable property that changes as a function of the magnitude of force applied. In one example, a strain-sensitive electrode 338 may be coupled to a portion of the force-sensitive structure 310b. The strain-sensitive electrode 338 can be coupled to an electrical circuit within the stylus 100. The electrical circuit can be configured to monitor one or more electrical properties (e.g., resistance, capacitance, accumulated charge, inductance, and so on) of the strain-sensitive electrode 338 for changes. The electrical circuit then quantifies these changes which may be used to estimate the applied force. Thereafter, the stylus 100 can communicate the applied force to the electronic device, which may be interpreted as a user input. In other embodiments, the deflection of the force-sensitive structure 310b can be measured in another manner such as with, but not limited to: optical sensors; acoustic sensors; resonance sensors; peizoresistive sensors; and so on.

The rigid signal conduit 310a includes a tubular shield 340. The tubular shield 340 includes a hollow portion and tray portion. The tubular shield 340 may provide electromagnetic shielding for electrical conduit (e.g., signal lines, traces, and so on) that passes through the hollow portion. The tubular shield 340 may also be configured to provide rigid structural support to transfer reaction forces applied to the force-sensitive structure 310b without substantial deflection or buckling. The tray portion of the tubular shield 340 may be configured to receive, support, and partially enclose a control board 342.

The rigid signal conduit 310a also includes a core insert 346. The core insert 346 includes a body 350 and a flexible circuit 352. The body 350 of the core insert 346 may be configured to be inserted within the tubular shield 340. The flexible circuit 352 of the core insert 346 may be configured to couple to the control board 342.

The stylus can create substantially-spherical electric fields at the tip, which affect the mutual capacitance of each capacitive sensing node nearby the tip. The host device can locate the stylus on the input surface by monitoring each capacitive sensing node for these capacitive changes and estimating the location at which such changes (if any) have occurred.

Figure 8:
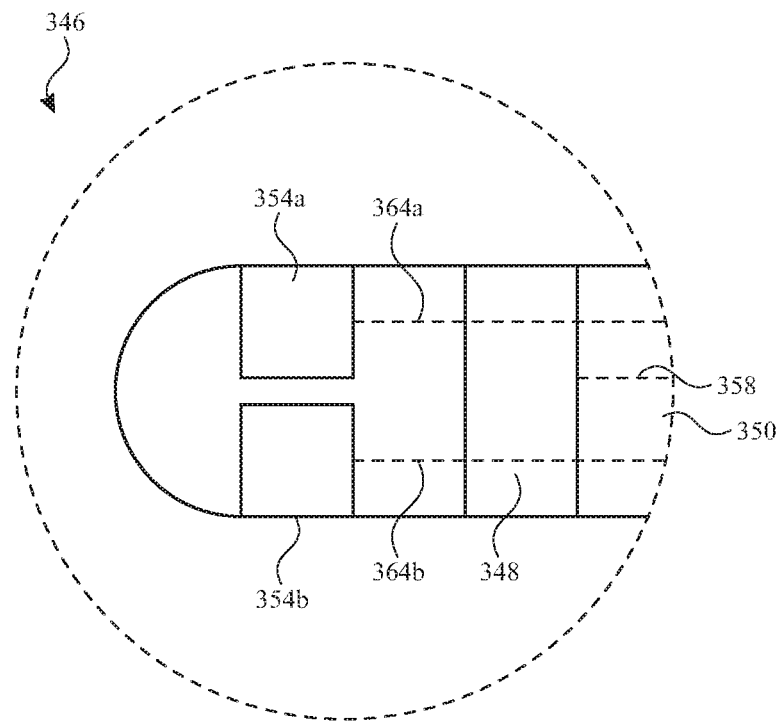
FIG. 8 illustrates an enlarged view of an end of the coordination engine assembly of the stylus of FIG. 7.

The core insert can include multiple conductive components on a surface of the body 350. These can serve as electric field generators to generate a tip field and a ring field (which may be detected by a coordination engine of an electronic device). As shown in FIG. 8, a pair of distal generators 354a and 354b can extend partially about a circumference of the body 350. The distal generators 354a and 354b can be axially aligned, so that they, together, extend about a majority of the circumference. The distal generators 354a and 354b can be radially opposite a central axis of the body 350.

A proximal generator 348 can be provided as a ring or other shape that extends about the body 350. The proximal generator 348 can be coaxially aligned with the distal generators 354a and 354b. Accordingly, the fields generated thereby are axially symmetrical. The proximal generator 348 is separated from the distal generators 354a and 354b by an axial distance.

The core insert 346 defines several signal paths there through. In one example, the core insert 346 defines three distinct signal paths 364a, 364b, and 358, configured to convey the signals to and/or from to the first distal generator 354a, the second distal generator 354b, and the proximal generator 348, respectively.

The first distal generator 354a, the second distal generator 354b, and the proximal generator 348 can be formed in any suitable manner. In many cases, many examples (and as illustrated), the generators are around (and/or partially within) the core insert 346. For example, the generators are formed on an external surface of the core insert 346. The generators can be disposed onto the external surface of the core insert 346 using any number of suitable manufacturing techniques, including, but not limited to: physical vapor deposition, pulsed laser deposition, self-adhering conductive film, metallic leafing techniques, metallic plating techniques, and so on. In other cases, the generators may be a solid metal piece that is insert-molded into the core insert 346.

As noted above, the first distal generator 354a, the second distal generator 354b, and the proximal generator 348 may each be configured to generate an electric field that is approximately spherical in nature when estimated from a particular distance. In other words, the generators may function, substantially, as a field source. The field generated by a ring-shaped field source (proximal generator 348) or two arc-shaped field sources (distal generator 354a and second distal generator 354b) is substantially spherical if measured from a distance greater than the radius of the generators. With respect to the arc-shaped field sources, they can be operated in tandem with the same signal output so that they, together, produce a field that is similar to a field generated by a continuous ring. At a certain distance away from the arc-shaped field sources, the field is the same as one that could be generated by a continuous ring or a point source.

While the first distal generator 354a, the second distal generator 354b, and the proximal generator 348 can be operated as electric field generators, they can also be operated as input modules during assembly of the stylus. For example, a stylus may lack certain external mechanisms for communicatively docking with another device. As such, the generators can be used as a communication port for programming, diagnosing, and repairing the stylus. Where the generators provide three distinct connections, each can provide separate communication with the control board and/or the processing unit circuit board set of the stylus. For example, the generators can be used as a transmit channel, a receiving channel, and a ground channel. By further example, the generators can be used as an anode, a cathode, and a ground electrode. Any one or more of the generators can serve as any one or more of the above. Accordingly, the stylus can be communicatively connected to another device via physical connections that provide electrical communication with at least three ports. Such connections can be concealed after assembly and optionally accessed by partial disassembly of the stylus.

Figure 9:
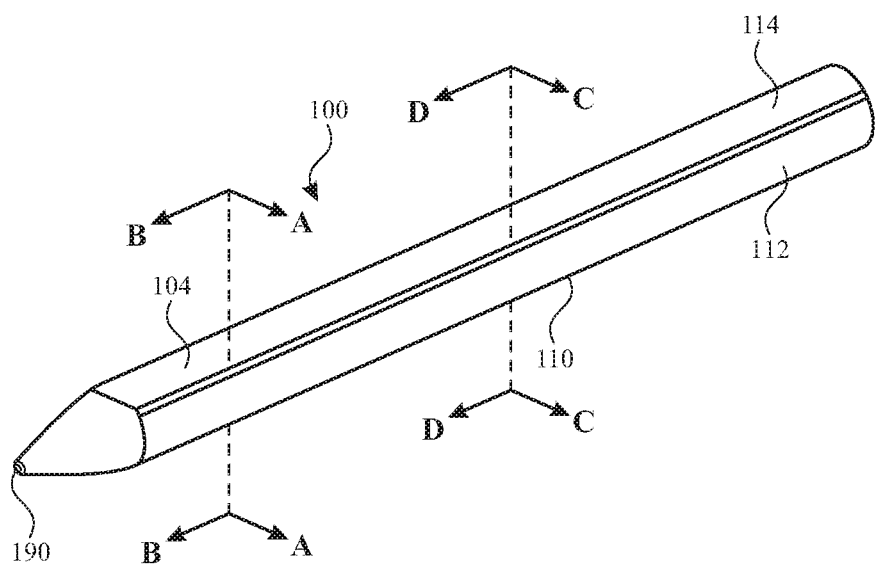
FIG. 9 illustrates a perspective view of a stylus, according to some embodiments of the subject technology.

Referring now to FIG. 9, the stylus 100 can support handling and operation by a user. In particular, the stylus 100 can receive inputs from a user at a location of the user's grip. FIG. 9 illustrates a stylus 100, according to some embodiments of the subject technology. According to some embodiments, for example as illustrated in FIG. 9, the stylus 100 can include a housing 110 that provides an outermost cover along at least a portion of the length of the stylus 100. A user can grip the stylus 100 at a user grip region 104 during use of the stylus 100. The user grip region 104 can be located at a natural grip location, so that the user can provide inputs at the same location that is grasped during normal use of the stylus 100. For example, the user grip region 104 can be located an outer surface of the housing 110. The user grip region 104 can be near the tip 190 of the stylus 100. For example, the location of the user grip region 104 can be a distance from the tip 190 that is less than a half, a third, or a quarter of the total length of the stylus 100. At the user grip region 104, components of the stylus 100 can be positioned to receive tactile input from the user. For example, the user grip region 104 can be a portion of the housing 110. Alternatively or in combination, the user grip region 104 can include an input component set within the housing 110, such as a button, switch, knob, lever, and/or another input component. According to some embodiments, a marker can be provided on the outer surface 112 as an indicator for the location of the user grip region 104. The marker can be flush with neighboring portions of the outer surface, such that it can be seen but provide the same tactile features as other portions of the housing 110. Alternatively or in combination, the marker can provide a protrusion, recess, or texture that provides surface features that are different from adjacent portions of the housing 110.

Figure 10:
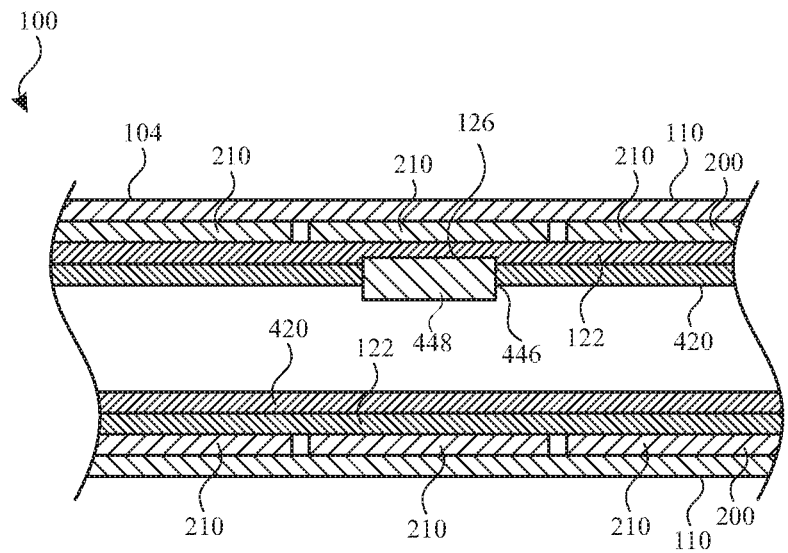
FIG. 10 illustrates a side sectional view of the section A-A of the stylus of FIG. 9, according to some embodiments of the subject technology.
Figure 11:
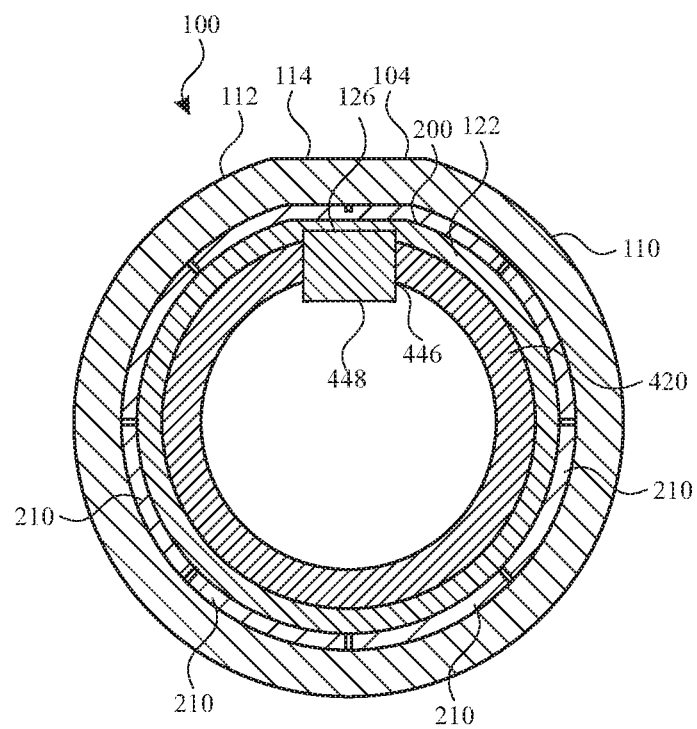
FIG. 11 illustrates a front sectional view of the section B-B of the stylus of FIG. 9, according to some embodiments of the subject technology.

Referring now to FIGS. 10 and 11, the stylus 100 can receive tactile input from the user at the user grip region 104 with a touch sensor 200. FIG. 10 illustrates a side sectional view of the stylus 100 taken along line A-A of FIG. 9, according to some embodiments of the subject technology. FIG. 11 illustrates a front sectional view of the stylus 100 taken along line B-B of FIG. 9, according to some embodiments of the subject technology. As shown in FIGS. 10 and 11, the stylus 100 can include a front magnet 448 that is within the housing 110. The front magnet 448 can be positioned within a front window 446 of the front frame 420. At least a portion of the front magnet 448 can be nested within a region 126 of the elastic insert 122, as discussed further herein. A similar arrangement can be provided for the rear magnet 498 discussed above. The position of the magnets within the touch sensor 200 allow the magnetic fields to be used to magnetically couple the stylus to a host device without interfering with the operation of the touch sensor 200. As the magnetic fields of the magnets can be static, the touch sensor can be calibrated after assembly to operate in the present of the magnetic fields.

As shown in FIG. 10, the touch sensor 200 can include multiple sensing elements 210 distributed along a longitudinal length of the stylus 100 at the grip region 104. For example, the sensing elements 210 shown in FIG. 10 are distributed longitudinally so that each sensing element 210 of a given column faces outwardly at a different portion of the housing 110. The touch sensor 200 can include 1, 2, 3, 4, 5, 6, 7, 8, 9, 10, or more than 10 sensing elements 210 along a longitudinal length. The distribution of sensing elements 210 provides independent sensing capabilities at multiple locations along the longitudinal length of the stylus 100 at the grip region 104.

As shown in FIG. 11, the touch sensor 200 can be positioned radially between a support member 402 and the housing 110 of the stylus 100. In addition, an elastic insert 122 can be positioned between the touch sensor 200 and the support member 402. With the elastic insert 122 positioned radially between the support member 402 and the touch sensor 200, the elastic insert 122 can bias the touch sensor 200 radially outwardly against the housing 110.

The touch sensor 200 can include multiple sensing elements 210 distributed circumferentially. For example, the sensing elements 210 shown in FIG. 11 are distributed circumferentially so that each sensing element 210 of a given row faces radially outwardly at a different portion of the housing 110. The touch sensor 200 can include 1, 2, 3, 4, 5, 6, 7, 8, 9, 10, or more than 10 sensing elements 210 about a circumference. The distribution of sensing elements 210 provides independent sensing capabilities at multiple locations about the circumference of the stylus 100 at the grip region 104.

The housing 110 can have one of a variety of cross-sectional shapes and sizes. As shown in FIG. 11, the housing 110 can include a curved portion 112 and a flat portion 114. The flat portion 114 can be used to stabilize the stylus 100 against another surface, such as a working surface, a host device, and/or a charging station, as discussed further herein.

As shown in FIG. 11, the housing 110 can be curved along some or all of an inner and/or outer surface. The housing 110 can be flat along some or all of an inner and/or outer surface. The touch sensor 200 can generally conform to the outer shape of the support member 402 and/or the elastic insert 122. Additionally or alternatively, the touch sensor 200 can generally conform to the inner shape of the housing 110, which may include flat and/or curved surfaces. Where the touch sensor 200 does not directly contact the inner surface of the housing 110, the touch sensor 200 can maintain a constant distance with respect to the housing 110, so that the presence of a finger on the housing 110 is reliably detectable by the touch sensor 200.

While the housing 110 in FIG. 11 has non-circular (e.g., partially round and partially flat) outer and inner cross-sectional shapes, it will be understood that the housing 110 can have outer and/or inner cross-sectional shapes that different from the shapes of FIG. 11. For example, the inner and/or outer cross-sectional shapes can be circular, to provide a substantially cylindrical shape.

Figure 12:
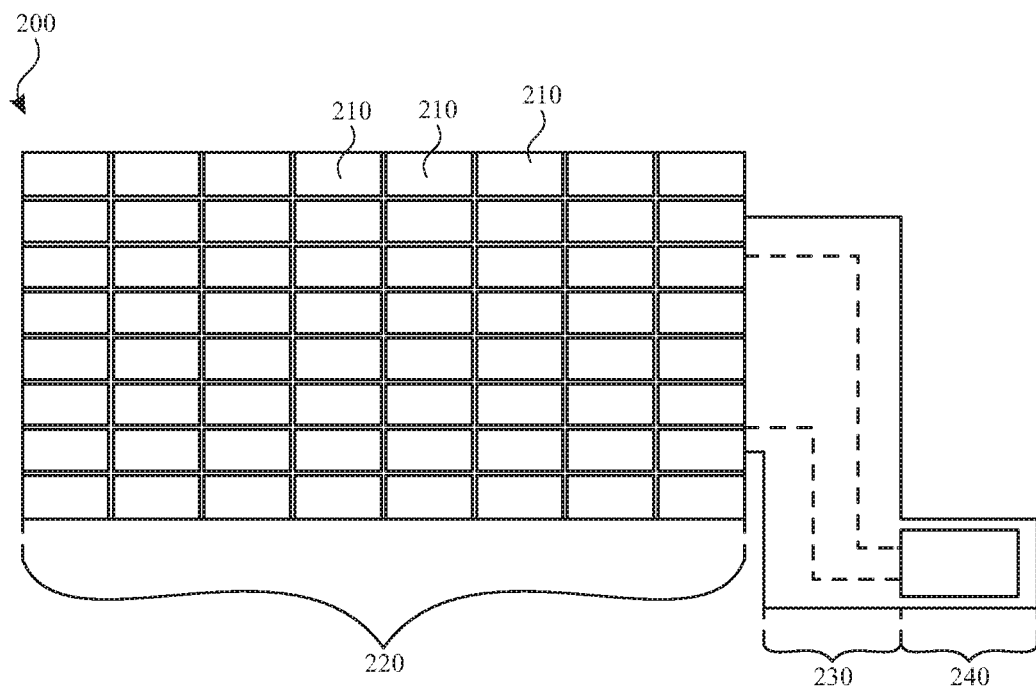
FIG. 12 illustrates a top view of a touch sensor, according to some embodiments of the subject technology.

The touch sensor 200 can be provided initially as a sheet or substantially flat article that is flexible and bendable. As shown in FIG. 12, the touch sensor 200 can include multiple sensing elements 210 along a sensing region 220 of the touch sensor 200. The sensing elements 210 can be arranged in a pattern or grid that includes multiple rows and/or columns. The sensing region 220 of the touch sensor 200 can be connected to an interface region 240 by a connector region 230. The interface region 240 can provide one or more electrical terminals for operatively connecting to the processing unit circuit board set 356 within the front frame 420. The touch sensor can extend from an exterior portion of the front frame 420 with the sensing region 220 to an interior portion of the front frame 420 with the interface region 240. The connector region 230 can transition from the exterior portion to the interior portion, for example, through a window of the front frame 420.

Figure 13:
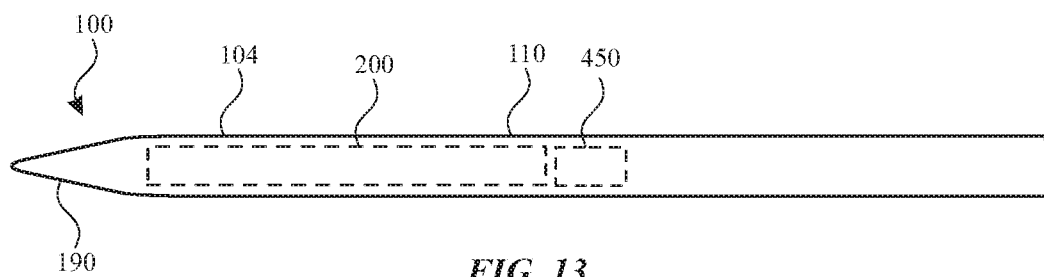
FIG. 13 illustrates a side view of a stylus, according to some embodiments of the subject technology.

As shown in FIG. 13, the touch sensor 200 can extend at least partially within a grip region 104 of the stylus 100 on a longitudinal side of the wireless power receiver 450. For example, the touch sensor 200 can extend along the grip region 104. The touch sensor 200 and the wireless power receiver 450 can be positioned along the longitudinal axis to have no overlapping portions.

Figure 14:
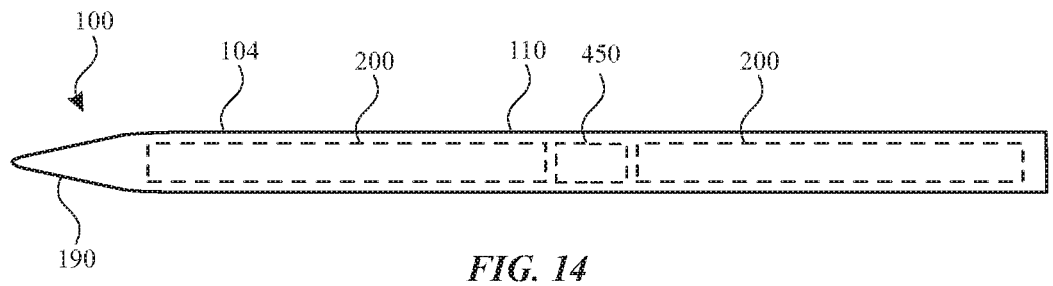
FIG. 14 illustrates a side view of a stylus, according to some embodiments of the subject technology.

As shown in FIG. 14, the stylus 100 can include multiple touch sensors 200 on opposite sides of the wireless power receiver 450. Each of the multiple touch sensors 200 can extend within a different portion of the housing 110. The touch sensors 200 can be spaced apart from each other. At least one of the touch sensors 200 can extend along the grip region 104. The touch sensors 200 and the wireless power receiver 450 can be positioned along the longitudinal axis to have no overlapping portions. Gestures detected by the separate touch sensors 200 can be interpreted as different user inputs according to preprogrammed functions to be performed by the stylus 100 and/or an external device upon detection of the user gestures.

Figure 15:
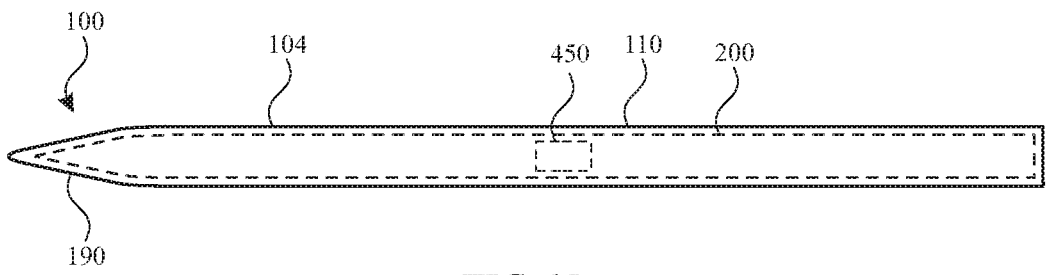
FIG. 15 illustrates a side view of a stylus, according to some embodiments of the subject technology.

As shown in FIG. 15, a touch sensor 200 can be positioned to extend across the wireless power receiver 450. In this configuration, the wireless power receiver 450 can be configured to operate through the touch sensor 200. In particular, charging can be performed when the stylus is not in use, and the touch sensor 200 can be deactivated during a charging session.

The touch sensor 200 can be provided to cause the stylus and/or the host device to perform one or more functions. While certain examples are provided herein, it will be appreciated that any function of the stylus and/or the host device can be performed according to preprogrammed features of the stylus and/or the host device. The touch sensor 200 can be used to detect where and whether the user is gripping the stylus 100. The touch sensor 200 can be used to change, select, and/or display one or more settings of the stylus and/or the host device. For example, the touch sensor 200 can detect gestures and transmit a signal to the host device to change, select, and/or display one or more settings that affect performance of the stylus and/or the host device. The setting can relate to a characteristic (e.g., color, size, width, thickness, shape, etc.) of a marking produced by use of the stylus with the host device The touch sensor 200 can be used to detect a tap, double tap, triple tap, or another tap gesture by the user. For example, as a user applies a finger at the grip region 104, the stylus 100 can detect the resulting capacitance that is induced in the touch sensor 200. The user can subsequently lift the finger, and the stylus 100 can detect the resulting capacitance or change in capacitance that is induced in the touch sensor 200. The user can subsequently return the finger to the grip region 104, and the stylus 100 can detect the resulting capacitance or change in capacitance that is induced in the touch sensor 200. The sequence of inputs within a span of time can be interpreted by the stylus 100 as a user's tap gesture. Additionally or alternatively, the touch sensor 200 can be used to detect a sliding gesture by the user. Multiple sensing elements of the touch sensor 200 along the grip region can be used in concert to detect particular user inputs. Additionally or alternatively, the touch sensor 200 can be used to detect a rolling gesture by the user. The rolling gesture can include movement of a finger about a circumference of the housing 110 and/or rolling movement of the housing 110 over a surface, such as a working surface. It will be appreciated that the touch sensor 200 can be used to detect combinations of gestures, including tap gestures, sliding gestures, rotational gestures, and/or other gestures. For example a sequence of different gestures in combination can be interpreted by the stylus 100 as a user's input.

Figure 16:
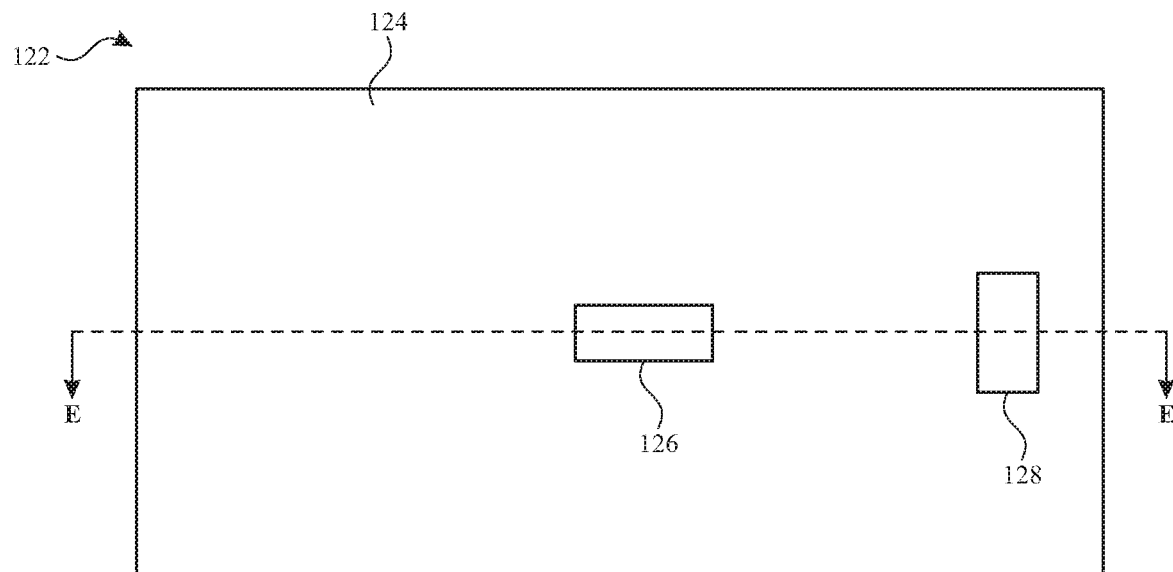
FIG. 16 illustrates a top view of an elastic insert, according to some embodiments of the subject technology.
Figure 17:
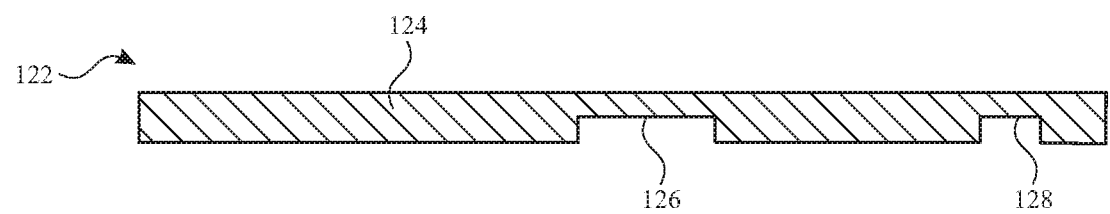
FIG. 17 illustrates a side sectional view of the section E-E of the elastic insert of FIG. 16, according to some embodiments of the subject technology.

Referring now to FIGS. 16 and 17, an elastic insert can be provided to bias the touch sensor radially outwardly against the housing and to conform to uneven surface features of the frame assembly. As shown in FIG. 16, the elastic insert 122 of the stylus can conform with adjacent features of the stylus to provide secure support for the touch sensor 200. As shown in FIG. 16, the elastic insert 122 can have different regions 124, 126, and 128 in which the material of the elastic insert 122 is provide with different thicknesses. For example, the elastic insert 122 can include one or more recesses at regions 126 and/or 128 on a side thereof. FIG. 17 illustrates a side sectional view of the elastic insert taken along line E-E of FIG. 16. As shown in FIG. 17, the recesses at regions 126 and 128 provide a locally thinned portion of the elastic insert 122, in which the thickness is less than at other regions of the elastic insert 122 (e.g., at the first region 124). As shown in FIG. 17, the thickness at a first region 124 is greater than a thickness at a second region 126 and/or a third region 128. The recesses can be positioned and sized to receive a portion of the frame assembly or a component supported thereby. For example, the recesses at the regions 126 and/or 128 can be sized and positioned to receive a magnet (e.g., front magnet 448 and/or rear magnet 498) or a lid (e.g., lid 490) covering an opening of the frame assembly. While these features can protrude along a surface of the frame assembly, the regions 126 and 128 of the elastic insert 122 provide an even and substantially smooth outer surface along the periphery of the elastic insert 122.

The stylus 100 can be assembled by a process that provides the touch sensor 200 at a grip region 104 of the stylus 100 with the front magnet 448 supported there within. For example, the touch sensor 200 and the elastic insert 122 can be provided in a flat or substantially planar configuration. The elastic insert 122 can be wrapped around the support member 402. The recesses of the elastic insert can be aligned with protruding features of the frame assembly. The touch sensor 200 can be wrapped around the elastic insert 122.

Next, the assembly including the front frame 420, the front magnet 448, the elastic insert 122, and the touch sensor 200 can be inserted into the housing 110. Prior to being inserted, the assembly can be oversized such that an outer cross-sectional dimension (e.g. diameter) of the touch sensor 200 is greater than an inner cross-sectional dimension (e.g., diameter) of the housing 110. Accordingly, as the assembled touch sensor 200 is inserted into the housing, 110, it will be compressed to conform to the inner surface of the housing 110. The touch sensor 200 can compress along with the elastic insert 122 when inserted into the housing 110. While within the housing 110, the elastic insert 122, under compression, biases the touch sensor 200 against the inner surface of the housing. The elastic insert 122 can include one or more of a variety of materials to provide such biasing under compression. For example, the elastic insert 122 can include a foam body, an elastomer, a matrix material, or another material having elastic properties. The elastic insert 122 can include an adhesive for bonding the touch sensor to the support member 402. For example, the elastic insert 122 can include a pressure-sensitive adhesive that is activated upon compression.

Figure 18:
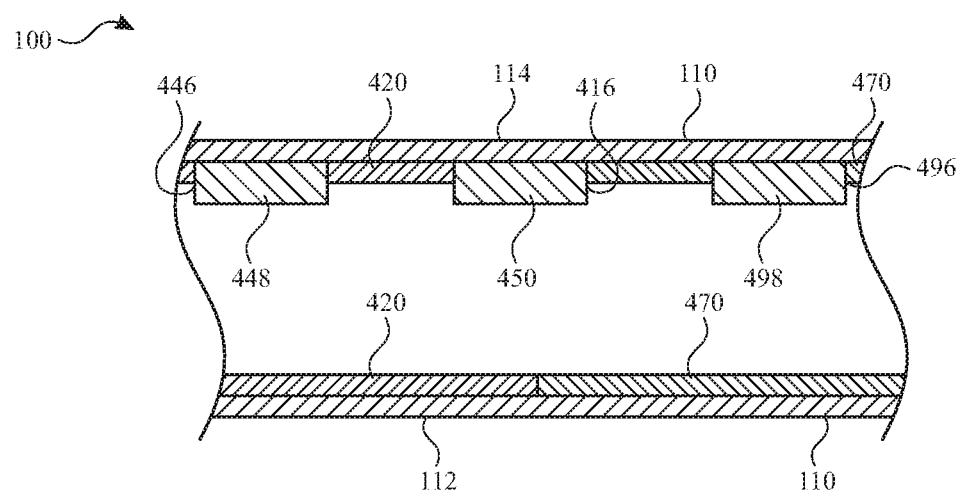
FIG. 18 illustrates a side sectional view of the section C-C of the stylus of FIG. 9, according to some embodiments of the subject technology.
Figure 19:
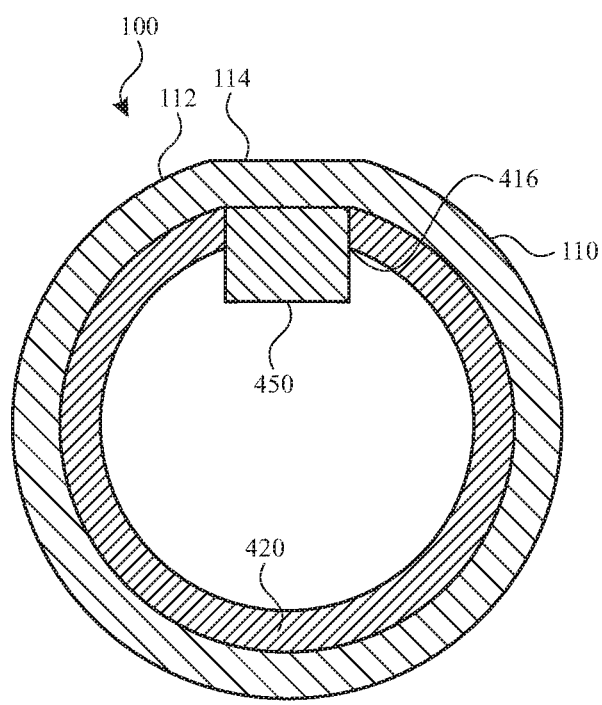
FIG. 19 illustrates a front sectional view of the section D-D of the stylus of FIG. 9, according to some embodiments of the subject technology.

Referring now to FIGS. 18 and 19, the stylus 100 can provide wireless charging capabilities. FIG. 18 illustrates a side sectional view of the stylus 100 taken along line C-C of FIG. 9, according to some embodiments of the subject technology. FIG. 19 illustrates a front sectional view of the stylus 100 taken along line D-D of FIG. 9, according to some embodiments of the subject technology. As shown in FIGS. 18 and 19, the stylus 100 can include a wireless power receiver 450 that is within the housing 110. The wireless power receiver 450 can be positioned within a charging window 416 that is formed between and/or by the front frame 420 and the rear frame 470. The front frame 420 and the rear frame 470 can be of a metallic and/or conductive material that provides adequate structural support and shielding to components housed therein. The wireless power receiver 450 can be positioned within the charging window 416 to be receptive to electromagnetic power transfer through the housing 110. Accordingly, the housing 110 can be of a material that is non-conductive or otherwise transparent to electromagnetic radiation transmitted there through.

Figure 20:
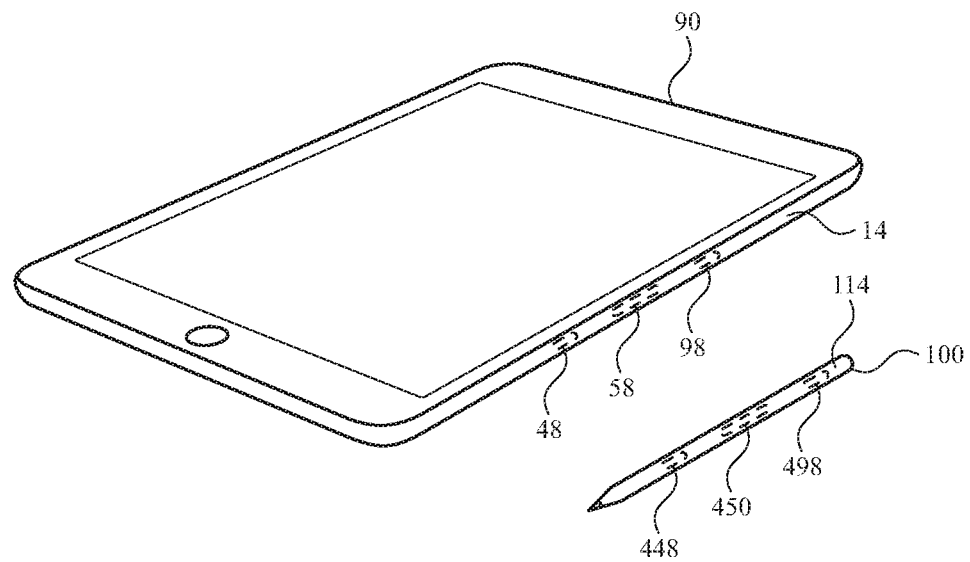
FIG. 20 illustrates a perspective view of a stylus and host device, according to some embodiments of the subject technology.
Figure 21:
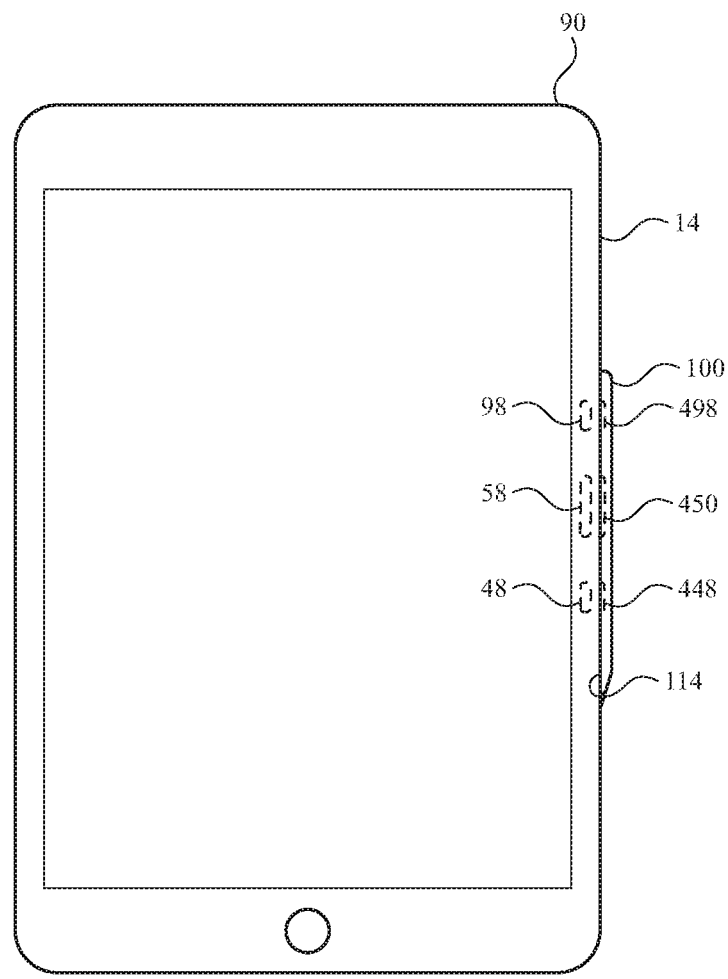
FIG. 21 illustrates a front view of a stylus and host device, according to some embodiments of the subject technology.

Referring now to FIGS. 20 and 21, use of the stylus with a host device can provide wireless charging for the stylus. As shown in FIG. 20, a wireless power receiver 450 within the housing of the stylus 100 and multiple stylus magnets 448 and 498 positioned on opposite sides of the wireless power receiver 450. The wireless power receiver 450 and the multiple stylus magnets 448 and 498 can be positioned on a same radial side of the stylus 100 and adjacent to a flat portion 114 of the housing. It will be understood that additional stylus magnets can optionally be included, and that the stylus magnets can be provided in other arrangements, such as on a same longitudinal side of the wireless power receiver 450.

The stylus magnets 448 and 498 provide magnetic coupling to corresponding host magnets 48 and 98 of the host device 90. As further shown in FIG. 20, a wireless power transmitter 58 is provided by the host device 90. The host magnets 48 and 98 can be positioned on opposite sides of the wireless power transmitter 58. The wireless power transmitter 58 and the host magnets 48 and 98 can be positioned so that, when the stylus magnets 448 and 498 are aligned with the host magnets 48 and 98, the wireless power receiver 450 is aligned with the wireless power receiver 450 of the host device 90. It will be understood that additional host magnets can optionally be included, and that the host magnets can be provided in other arrangements, such as on a same longitudinal side of the wireless power transmitter 58.

The magnetic coupling can maintain the alignment during a charging session. The flat portion 114 of the stylus can facilitate secure coupling to an engagement portion 14 of the host device 90. For example, the engagement portion 14 of the host device 90 can provide another flat surface or other complementary shape to facilitate physical contact of the opposing surfaces and maintain close proximity to the wireless power transmitter 58 and the wireless power receiver 450. It will be understood that other surface shapes and features are contemplated to facilitate contact and engagement of the stylus to the host device. For example, the surfaces can be flat, curved, concave, convex, undulating, stepped, tapered, or another shape to provide engagement.

Accordingly, components of a stylus and the assembly thereof are provided in a manner that facilitates capacitive touch input, magnetic coupling with a host device, and wireless charging from the host device. The touch sensor can be integrated into an input device in a low profile form that facilitates assembly and securement of the components of the stylus. Wireless charging and magnetic coupling with a host device are also facilitated. The stylus can be provided with the above features in a small form factor that improves a user experience with the stylus. It will be understood that variations in the illustrated examples can be provided to achieve similar results.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the host device can be any device that interacts with a touch-based input device. For example, a host device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A stylus comprising:
   a housing comprising a non-conductive material;
   a frame assembly within the housing and comprising a metallic material and having a charging window; and
   a wireless power receiver within the charging window and adjacent to the housing.

2. The stylus of claim 1, wherein the frame assembly comprises a first frame and a second frame, wherein the first frame and the second frame are joined together to define the charging window.

3. The stylus of claim 2, further comprising:
   a battery pack within the second frame and operatively connected to the wireless power receiver; and
   a processing unit circuit board set within the first frame.

4. The stylus of claim 3, further comprising an antenna assembly comprising:
   an antenna extending outside of the second frame;
   a connector connected to the processing unit circuit board set; and
   a transmission line connecting the antenna to the connector and extending between the second frame and the battery pack.

5. The stylus of claim 2, wherein the stylus comprises:
   a first stylus magnet within a first window of the first frame; and
   a second stylus magnet within a second window of the second frame, wherein when the first and second stylus magnets are aligned with host magnets of a host device, the wireless power receiver is aligned with a wireless power transmitter of the host device.

6. The stylus of claim 1, wherein the housing has a longitudinal portion forming a substantially flat exterior surface extending along a length of the stylus.

7. A stylus comprising:
   a housing having a longitudinal portion forming a substantially flat exterior surface extending along a length of the stylus;
   a wireless power receiver within the housing and adjacent to the longitudinal portion; and
   multiple stylus magnets for magnetically coupling to corresponding host magnets of a host device, the stylus magnets being within the housing and adjacent to the longitudinal portion, wherein when the stylus magnets are aligned with the host magnets the wireless power receiver is aligned with a wireless power transmitter of the host device.

8. The stylus of claim 7, wherein the housing defines a grip region of the stylus, the stylus further comprising:
   a capacitive touch sensor comprising multiple sensing elements distributed circumferentially and longitudinally along an inner surface of the housing at the grip region, wherein the capacitive touch sensor is positioned radially between one of the stylus magnets and the housing.

9. The stylus of claim 7, further comprising a frame assembly comprises a first frame and a second frame, wherein the first frame and the second frame are joined together to define a charging window and to support the wireless power receiver within the charging window.

10. The stylus of claim 9, wherein the multiple stylus magnets comprise a first magnet within the first frame and a second magnet within the second frame.

11. The stylus of claim 9, further comprising:
    a processing unit circuit board set;
    a tip moveable with respect to the housing; and
    a force sensor configured to indicate to the processing unit circuit board set when a force is applied to the tip.

12. A stylus comprising:
    a frame assembly having an outer surface and supporting a component that protrudes beyond the outer surface;
    an elastic insert positioned about the frame assembly and receiving a portion of the component within a recess thereof;
    a flexible touch sensor positioned about the elastic insert; and
    a housing positioned about the flexible touch sensor.

13. The stylus of claim 12, further comprising:
    a processing unit circuit board set within the frame assembly, the elastic insert, the touch sensor, and the housing;
    a tip moveable with respect to the housing; and a force sensor configured to indicate to the processing unit circuit board set when a force is applied to the tip.

14. The stylus of claim 13, wherein the touch sensor comprises multiple sensing elements distributed circumferentially and longitudinally within the housing, wherein each of the sensing elements is configured to indicate to the processing unit circuit board set when a user is contacting a corresponding portion of the housing.

15. The stylus of claim 12, wherein the component is a lid covering an opening in the frame assembly.

16. The stylus of claim 12, wherein the component is a magnet within a window of the frame assembly.

17. The stylus of claim 12, wherein the elastic insert is positioned radially between the frame assembly and the flexible touch sensor and biases the flexible touch sensor radially outwardly against the housing.

18. The stylus of claim 12, wherein the housing comprises inner and outer surfaces each having a curved portion and a flat portion extending along a longitudinal length of the housing.

19. The stylus of claim 12, wherein the elastic insert comprises a foam body.

20. The stylus of claim 12, wherein the elastic insert comprises a pressure-sensitive adhesive bonding the touch sensor to the frame assembly.

* * * * *